United States Patent [19]

Stinauer et al.

[11] Patent Number: 5,042,071

[45] Date of Patent: Aug. 20, 1991

[54] ACOUSTIC INSULATOR FOR A TELEPHONE HANDSET MICROPHONE

[75] Inventors: Robert J. Stinauer, Arlington Heights; Michael A. Stein, Chicago, both of Ill.

[73] Assignee: Motorola, Inc., Schaumburg, Ill.

[21] Appl. No.: 467,098

[22] Filed: Jan. 18, 1990

[51] Int. Cl.⁵ .................. H04R 25/00; H04M 1/00
[52] U.S. Cl. .................. 381/158; 381/168; 381/169; 379/428; 379/433
[58] Field of Search ............ 379/392, 430, 433, 437, 379/428; 381/60, 68, 68.6, 95, 113, 151, 158, 168, 169

[56] References Cited

U.S. PATENT DOCUMENTS

| | | | |
|---|---|---|---|
| 4,516,428 | 5/1985 | Konomi | 381/113 |
| 4,773,091 | 9/1988 | Busche et al. | 381/169 |
| 4,870,688 | 9/1989 | Vorobu et al. | 381/60 |
| 4,937,877 | 6/1990 | Pocock et al. | 381/158 |
| 4,984,268 | 1/1991 | Brown et al. | 379/433 |

FOREIGN PATENT DOCUMENTS

| | | | |
|---|---|---|---|
| 0209952 | 9/1987 | Japan | 379/433 |
| 0021760 | 1/1990 | Japan | 379/433 |

OTHER PUBLICATIONS

Motorola Incorporated "DYNA T.A.C. Cellular Mobile Telephone", 8/31/83 Mechanical Parts (Control Unit).

Primary Examiner—Jin F. Ng
Assistant Examiner—William Cumming
Attorney, Agent, or Firm—Kenneth W. Bolvin

[57] ABSTRACT

An apparatus to isolate a microphone from the speaker audio of a telephone handset, preventing feedback howl. The acoustic insulator consists of a single piece of pliable material that has a smaller diameter element (104) that extends through the handset housing. A hollow passage (102) extends the length of the insulator. The microphone (101) is inserted into the insulator in the larger diameter element (103). The insulator is held in the housing by overlapping ridges (105) encircling the outside of the larger element (103).

4 Claims, 1 Drawing Sheet

ACOUSTIC INSULATOR FOR A TELEPHONE HANDSET MICROPHONE

FIELD OF THE INVENTION

The present invention relates generally to the communications field and in particular to radiotelephone communications.

BACKGROUND OF THE INVENTION

In both radio and landline telephone systems, a user communicates by means of a handset that includes a speaker at one end that is placed close to the user's ear and a microphone at the other end that is held close to the user's mouth. This placement ensures that the audio from the speaker does not reach the microphone causing feedback problems. If the handset is taken away from the face, however, the speaker audio has a free path to the microphone. This is especially true when the handset is placed facedown on a surface. The surface acts as a reflector, reflecting the audio from the speaker to the microphone.

In addition, a microphone mounted directly to the mouthpiece in the handset, may cause feedback problems. The sound from the speaker causes the handset to vibrate and therefore the microphone, if not insulated from the handset, to vibrate. This vibration is transmitted by the microphone, causing the feedback problem to occur.

Government regulations restrict the amount of speaker audio to microphone coupling. Many countries have this type of regulation due to their cellular radiotelephone systems producing high sidetone levels. The higher sidetone levels would produce an irritating feedback howl if the speaker audio is coupled to the microphone. There is a resulting need for a way to isolate the microphone from the rest of the handset.

SUMMARY OF THE INVENTION

The present invention encompasses an acoustic insulator substantially comprised of a single piece of material formed into two elements. One element has a larger diameter than the other with a series of ridges encircling the larger element. The insulator contains a hollow passage in the middle extending the length of the insulator.

A microphone is inserted in the hollow region in the first element. Sound is able to reach the microphone through the rest of the hollow passage ahead of the microphone. The insulator is inserted in the handset mouthpiece. A small length of the insulator extends past the handset housing. This part of the insulator rests on a surface when the handset is placed on a surface, sealing the microphone from the speaker audio.

DETAILED DESCRIPTION OF THE PREFERRED EMBODIMENT

The present invention isolates a microphone in a telephone handset housing from the handset's speaker audio. The acoustic insulator prevents the speaker audio from reaching the microphone, thereby reducing feedback problems.

Figure 1:
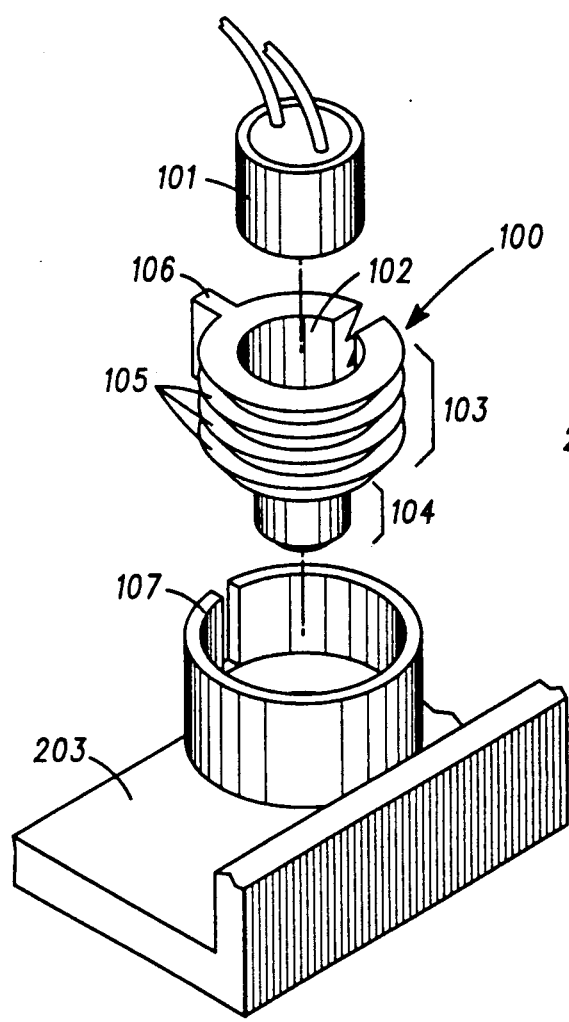
FIG. 1 illustrates the present invention.

The present invention, as illustrated in FIG. 1, encompasses an acoustic insulator (100) substantially comprised of a single piece of material, thermoplastic elastomer in the preferred embodiment, having two elements (103 and 104). The first element (103) has a larger diameter than the second element (104). In addition, encircling the first element (103) are a series of overlapping ridges (105). The acoustic insulator (100) has a hollow passage (102) for the length of the insulator (100).

The acoustic insulator (100) operates by inserting the microphone (101) into the hollow passage (102) of the first element (103). Voice and other audio can reach the microphone (101) through the remaining hollow passage (102) that extends for the remaining length of the insulator (100). The insulator (100) with the microphone (101) is inserted into a cup (107) in the mouthpiece section (203) of the telephone handset (200). Once inserted, the overlapping ridges (105) encircling the outside of the first element (103) of the insulator (100) prevent it from being removed. A tab (106) extending from the first element (103) can be used to lock the insulator (100) into a certain position in the cup (107), so that is does not rotate.

Figure 2:
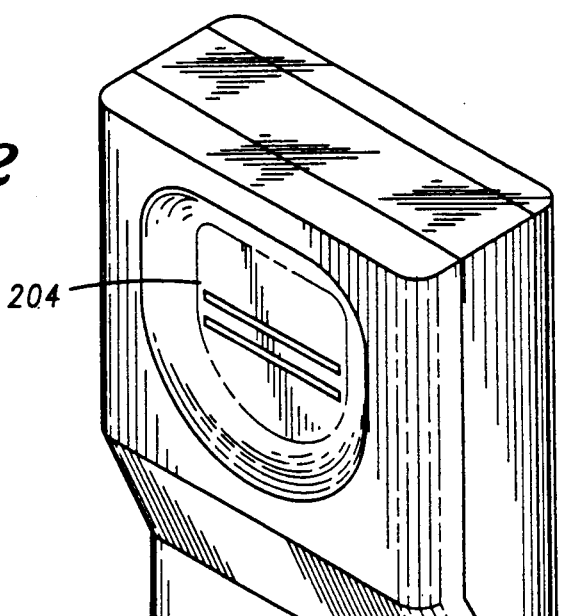
FIG. 2 illustrates the present invention used in a typical application.

The present invention inserted into a typical handset (200) is illustrated in FIG. 2. The smaller diameter element (104) extends through the handset housing (200) a short distance. When the handset (200) is placed on a surface, mouthpiece section down, the insulator (100) isolates the microphone (101) from the speaker (204) audio by sealing around the microphone hole. The smaller diameter element (104) allows the handset (200) to be placed on a surface that is irregular, and still seal against the surface. A larger diameter element would move with the irregularity and not seal, allowing the audio feedback problem to occur.

The acoustic insulator also isolates the microphone from the handset housing by surrounding it with the pliant material of the insulator. With this isolation, the audio from the handset's speaker cannot reach the microphone by vibrating the handset housing; the insulator absorbs the vibrations.

In summary, an acoustic insulator, to isolate a microphone in a handset, has been described. The insulator creates a seal around the microphone inlet when the handset is placed on a surface suppressing the howl condition that would result from the speaker audio reaching the microphone.

We claim:

1. An acoustic insulator, insertable into a mouthpiece of a telephone handset, for holding a microphone, comprising:
   a) a first element having a first diameter, a first length, and a first hollow passage extending the first length;
   b) a second element having a second diameter less than the first diameter, a second length, and a second hollow passage extending the second length, the second hollow passage coupled to the first hollow passage, at least a portion of the second element extending through the mouthpiece when the acoustic insulator is inserted into the telephone handset; and
   c) at least one ridge, extending from and encircling the first element, for holding the acoustic insulator in the telephone handset.

2. The acoustic insulator of claim 1 wherein the first and second elements are comprised of a single length of thermoplastic elastomer.

3. An acoustic insulator, insertable into a mouthpiece of a telephone handset, for holding a microphone, comprising:
   a) a first element having a first diameter, a first length, and a first hollow passage extending the first length;
   b) a second element having a second diameter less than the first diameter, a second length, and a second hollow passage extending the second length the second hollow passage coupled to the first hollow passage, at least a portion of the second element extending through the mouthpiece when the acoustic insulator is inserted into the telephone handset; and
   c) a plurality of ridges encircling and extending out from the first element.

4. A telephone handset having an earpiece and a mouthpiece, comprising:
   an acoustic insulator for holding a microphone, comprising:
   a) a first element having a first diameter, a first length, and a first hollow passage extending the first length; and
   b) a second element having a second diameter less than the first diameter, a second length, and a second hollow passage extending the second length, the second hollow passage coupled to the first hollow passage, at least a portion of the second element extending through the mouthpiece when the acoustic insulator is inserted into the telephone handset; and
   c) at least one ridge, extending from and encircling the first element, for holding the acoustic insulator in the telephone handset.

* * * * *